United States Patent [19]

Neckermann

[11] Patent Number: 5,367,024
[45] Date of Patent: Nov. 22, 1994

[54] COMMINUTED STYRENE ACRYLONITRILE (SAN) FOR USE AS AN ANTI-SLIP OR ABRASIVE GRIT, TEXTURIZER, AND FILLER, AND METHOD OF MAKING THE SAME

[75] Inventor: Edwin F. Neckermann, Kalamazoo, Mich.

[73] Assignee: American Fillers & Abrasives Co., Inc. a corporation of Michigan, Bangor, Mich.

[21] Appl. No.: 916,171

[22] Filed: Jul. 17, 1992

[51] Int. Cl.$^5$ .......................... C08F 8/30; C08L 75/04
[52] U.S. Cl. ..................................... 525/123; 525/131; 524/502; 524/505; 428/402; 427/212
[58] Field of Search ................. 525/123, 131; 524/356, 524/507, 589, 590, 502, 505; 427/212; 428/402

[56] References Cited

U.S. PATENT DOCUMENTS 5,122,552  6/1992  Johnson ............................... 524/589

Primary Examiner—John Kight, III
Assistant Examiner—D. Truong
Attorney, Agent, or Firm—Palmatier & Zummer

[57] ABSTRACT

A light weight resinous plastic co-polymer comprised of styrene and acrylonitrile is ground to various sizes, especially 20 mesh and 40 mesh, and is used as an anti-slip grit, as a texturizer, and/or as a filler in coatings and plastic resins. The co-polymer, having a specific gravity of around 1.08 (water=1.0), is dispersed in or broadcast upon a liquid resin or resin system. The co-polymer disperses clear and stays suspended without adjustment or with minor adjustments to the colloidal matrix of the system.

11 Claims, No Drawings

5,367,024

COMMINUTED STYRENE ACRYLONITRILE (SAN) FOR USE AS AN ANTI-SLIP OR ABRASIVE GRIT, TEXTURIZER, AND FILLER, AND METHOD OF MAKING THE SAME

FIELD OF THE INVENTION

This invention relates to granular materials for use as an abrasive grit, anti-slip agent, texturizer, and filler in 100% solid resin coatings, water borne coating systems, and aliphatic solvent coatings, and for limited use in non-preformulated aromatic and ketone solvent systems. The invention also relates to methods of making such abrasive grit and to liquid coating materials, resin coatings and resinous materials incorporating such abrasive grit as an anti-slip agent, texturizer and/or filler.

BACKGROUND OF THE INVENTION

It is well known that granular silicates, such as sand, and solid glass spherical granules or beads are used extensively in clear finishes to achieve an anti-slip or texturized surface. It is also well known that inorganic granular materials, comminuted natural polymers, such as wood flour and cellulosics, and comminuted protein-type polymers are used as fillers and texturizers. However, the use of sand and other silicates as anti-slip agents and texturizers has the disadvantage that sand and other silicates have high specific gravities, so that they tend to settle out rapidly in liquid coating materials. The same disadvantage applies to glass beads, which have the additional disadvantage of being expensive. Natural polymers, such as wood flour and cellulosics, and protein-type polymers have the disadvantages that they have low durability and are subject to deterioration due to adverse environmental conditions and aging.

OBJECTS OF THE INVENTION

One important object of the present invention is to provide a new and improved granular material which is highly effective as an anti-slip agent, a texturizer, and a filler, and which is water-repellant and resistant to oxidizing acids, alkalis, and detergents, yet is low in cost.

A further object is to provide a granular filler material of the foregoing character which does not affect the gloss in clear or filled resins, and which disperses clear in clear resins, so that the clarity of the clear resins is not impaired.

A further object is to provide granular materials of the foregoing character which are light in weight so that the materials will not settle out rapidly when dispersed in liquid coating materials and resins.

SUMMARY OF THE INVENTION

These and other objects of the invention can be achieved by starting with pieces of a resinous plastic material in the form of a co-polymer of styrene and acrylonitrile (SAN) which may comprise reclaimed material or virgin material or a mixture of reclaimed and virgin material. The co-polymer pieces are comminuted or milled, preferably using a hammer mill equipped with a 7/64-inch screen, or a 5/64-inch screen or a 3/64-inch screen. The milled product, using the 7/64-inch screen, has a particle size of 10 mesh and finer, which means that substantially all of the particles will pass through a screen having 10 openings per inch. When the 5/64-inch screen is used in the hammer mill, the product has a particle size of 12 mesh or finer. When the 3/64-inch screen is used in the mill, the product has a particle size of 14 mesh and finer. To provide a large volume of still finer products, the granular material from the hammer mill is classified by further sieving to produce granular co-polymer products having 20 mesh and 40 mesh particle sizes, which have been found to be very suitable and advantageous for use in the present invention. However, the present invention is not limited to these particle sizes but is applicable to a range of particle sizes including all particle sizes finer than 40 mesh, and all particle sizes between 20 and 40 mesh.

The classified granular materials are mixed with liquid coating materials so that the coating materials will produce anti-slip and texturized coatings when the coating materials are spread in a thin layer by any known or suitable means on a floor, wall or any other surface. The classified granular materials may also be mixed as fillers with liquid resins, such as epoxies or urethanes, which are then polymerized or otherwise cured or solidified to produce polymer coatings or shapes.

DETAILED DESCRIPTION OF EXAMPLES

Examples A-F below represent formulations and uses of SAN granular materials as an anti-slip agent and a texturizer in trade sale liquid coating materials in the form of acrylic latex and vinyl acetate paints. In order to illustrate the effects of clarity, uniformity of texture and stability, the examples involve the use of a 20 mesh and finer grade and a 40 mesh and finer grade of the SAN granular materials. These examples involve the use of the SAN granular materials in trade sale acrylic latex and vinyl acetate paints, formulated to produce high gloss, semi-gloss, and flat finishes, so as to illustrate the effects on gloss and texture.

Twenty mesh grit or particles are of a size corresponding to 20 screen openings per inch. Forty mesh grit or particles are of a size corresponding to 40 screen openings per inch.

In Examples G and H, the SAN granular materials were mixed with clear gloss and flat trade sales polyurethane liquid coating materials, to illustrate the clarity and anti-slip properties which were achieved.

Examples I and J involve the use of epoxy coating materials to illustrate the SAN granular material as an anti-slip agent or texturizer, using both a formulated system and a broadcasting technique.

Example K illustrates the SAN granular material as a filler in epoxy resin.

For the purpose of ease of comparison of uniformity and gloss, Examples A-I involve the use of a standardized proportion of five (5) ounces of SAN granular material or grit per gallon of paint, coating material and/or resin.

Example A.

Texturized Interior-Exterior Trade Sale High Gloss Acrylic Latex paint consisting of:

| Vehicle: | Acrylic Emulsion such as Rhoplex HG-74 (42.5% solids, 57.5% water) | 74.3% |
|---|---|---|
| | Additives | 1.1% |
| | Glycols | 10.2% |
| | Water | 14.4% |
| Pigment: | TiO$_2$ | 100.0% |
| Texturizer: | SAN grit - 20 mesh (5 oz/gal) | 100.0% |

The above material was rolled out onto masonite and a plywood base. The 20 mesh particles were distributed evenly throughout the coating. There was no discernable difference in gloss or viscosity between the example and the control (no SAN grit added). Drying time was the same for both the control and the sample. On dried coatings, there was no apparent gloss or whiteness difference between control and example. To obtain complete texturizer cover-age of the surface, SAN grit in the amount of 5 oz/gal was used.

The additives referred to in this example and all other examples include mildewcides, bactericides, antioxidants and ultraviolet light absorbers.

Example B.

The same formula was used as in Example A except that the forty mesh SAN grit was substituted for the twenty mesh SAN grit. As in Example A, there was no visible difference in gloss or viscosity between the example and the control. Drying time was the same for both the control and the example. On dried coatings there was no apparent gloss or whiteness difference between the control and the example. As might be expected, the dried surface using the forty mesh grit had more texturized surface coverage but half the profile. To obtain complete SAN grit coverage, we used 5 oz/gal of the SAN grit.

Example C.

Texturized Interior-Exterior Semi-Gloss Acrylic Latex paint consisting of:

| Pigment: | TiO₂ | 100.0% |
|---|---|---|
| Vehicle: | Acrylic Emulsion such as Rhoplex AC490 Acrylic Interior-Exterior Semi-Gloss vehicle having 46% solids and 54% water | 65.0% |
| | Additives | 1.2% |
| | Glycols | 3.4% |
| | Water | 30.4% |
| Texturizer: | SAN - 20 mesh grit (5 oz/gal) | 100.0% |

The above material was applied in the same manner to the same type of surfaces as in Example A. There was no visible difference in gloss or viscosity between the example and the control. Drying time was the same for both the control and the example. On dried coatings, there was no apparent gloss or whiteness difference between the control and the example.

Example D:

The same formula was used as in Example C except forty mesh SAN grit was substituted for 20 mesh SAN grit. As in the above example, there was no visible difference in gloss or viscosity between the example and the control. Drying time was the same for both the control and the example. On dried coatings there was no apparent gloss or whiteness difference. As might be expected, the dried surface using 40 mesh grit had more textured particles per unit area than were present on the surface using the 20 mesh grit, but half the profile.

Example E:

Textured Interior-Exterior Flat Vinyl Acetate Acrylic paint consisting of:

| Pigment: | (40.5% TiO₂ - 59.5% Silica) | 100.0% |
|---|---|---|
| Vehicle: | Vinyl Acetate Emulsion (Vinyl Acetate Acrylic Resin, 55.0% - Water, 45%) | 43.7% |
| | Additives | 2.1% |
| | Glycols | 7.9% |
| | H₂O | 46.3% |
| Texturizer: | (SAN grit - 20 Mesh: 5 oz/gal) | 100.0% |

The above material was applied in the same manner to the same type surface as in Example A. There was no visible difference in gloss or viscosity between Example E and the control (same formula as in Example E except no texturizer) of the wet surface. Drying time was the same for the control and the example. On the dried surface, there was no apparent gloss or whiteness difference between the control and the example.

Example F:

The formula used was the same as that used in Example E, except that forty mesh SAN grit was substituted for the 20 mesh grit. As in the above example, the wet surface did not exhibit any visible difference in gloss or viscosity between the example and the control. Drying time was the same for both the control and the example. On dried coatings, there was no visible difference in gloss or whiteness. As might be expected, the dried surfaces using 40 mesh SAN grit had more textured particles per unit area than the 20 mesh grit but half the profile.

Example G:

Trade Sales clear Gloss Polyurethane coating material consisting of:

| Non-volatile ASTM #1 Polyurethane Resin | 51.0% |
|---|---|
| Aliphatic Hydrocarbons, such as mineral spirits, for example | 49.9% |
| Vegetable Oil, such as soy oil, for example | 0.1% |
| Texturizer: (SAN grit, 20 mesh, 5 oz/gal) | 100.0% |

The above formula was rolled on clay tile, ceramic tile, vinyl tile, and a finished wood surface. The SAN grit dispersed into the polyurethane coating material clear (without affecting the clarity thereof). When applied to the wood surface, the color and wood grain were clearly visible. There was no apparent difference in drying time, and the dried polyurethane coating, with the SAN anti-slip agent, texturizer, and filler, was completely clear. The only difference noted between the sample containing SAN grit and the control was the "rough" and abrasive feel. There was no apparent difference in gloss or clarity of the resins on wood, ceramic tile, or clay tile.

Example H:

The same formula was used as in Example G, except that the forty mesh SAN grit was substituted for the twenty mesh SAN grit. As in Example G, there was no visible difference in the gloss, viscosity, or clarity of the mixture. Application on wood surfaces and tiles were identical. The apparent drying time was the same. The dried coating revealed the same results of clarity and gloss. The number of particles per unit area was more, as expected, than in the case of the twenty mesh grit. As in Example G, the only visual difference was roughness. Tile pattern and wood grain were unobscured by the resin coating.

Example I:

Epoxy Resin with SAN grit: One part epoxy resin (such as Shell Epon 828) and 0.35 part amine hardener (such as Shering Berlin Polymers-Euredur 3060) were mixed and painted on clay type tiles. SAN grit (20 mesh) was broadcast over the wet surface which was allowed to dry. Both wet and dry surfaces displayed similar properties. There was no apparent wet difference in gloss or viscosity. In the cured and dry resin, the SAN grit was clear and produced a well profiled texture and rough surface.

Example J:

As in Example I, an epoxy resin mixture was prepared, consisting of 1 part epoxy and 0.35 part amine hardener. To one quart of the uncured mixture, 2.5 ounces (10 oz/gal) of 20 mesh SAN grit was added and mixed. The resulting mixture was painted onto a clay tile and cured. A well defined clear profile was achieved as in Example I. However, due to the surface tension of the resin-hardener mixture, the cured coating did not provide a profile having the sharpness of the broadcast sample (Example I). Adjustments to lower the initial viscosity seemed to reduce the surface tension and provide a sharper profile. A higher surface tension resin system using a different amine hardener produced even less of a profile.

Example K:

Using the same resin system as in Example J, the epoxy mixture containing SAN grit was poured onto a non-adhesive surface to determine the attributes of SAN grit as a filler. Trials using two hardener systems described in Examples I and J showed that the SAN grit remained suspended. Trials using several other Epoxy systems have shown that the SAN grit may settle out or rise to the top, depending upon the density of the resin system, which resin is used, which hardener is used, and whether the colloidal matrix of the system is adjusted.

In Examples G and H, an aromatic solvent, such as benzene, for example, or a ketone solvent, such as acetone, for example, may be substituted for the aliphatic hydrocarbon solvent, such as mineral spirits, for example, provided that the SAN grit is supplied in a dry state and is mixed with the liquid coating material immediately before it is spread over the surface to be coated. Alternatively, the SAN grit may be broadcast upon the wet coating material, immediately after it is spread over the surface. In either case, the solvent evaporates rapidly before it can soften the SAN grit and cause it to swell. Such softening and swelling will occur if the solvent is left in contact with the grit for any substantial length of time.

Various modifications, alternative constructions and equivalents may be employed, without departing from the true spirit and scope of the invention, as exemplified in the preceding description and defined in the following claims.

I claim:

1. A liquid coating material for producing an anti-slip texturized coating, said coating material comprising a paint material including a mixture of a vehicle, a pigment material, and comminuted styrene acrylonitrile co-polymer grit having a particle size corresponding to 20 mesh openings per inch and finer.

2. A liquid coating material according to claim 1, in which said comminuted styrene acrylonitrile co-polymer grit has a particle size corresponding to 40 mesh openings per inch and finer.

3. A liquid coating material for producing an anti-slip texturized coating, said coating material comprising a mixture of a polyurethane coating material and comminuted styrene acrylonitrile co-polymer grit having a particle size corresponding to 20 mesh openings per inch and finer.

4. A liquid coating material according to claim 3, in which said comminuted styrene acrylonitrile copolymer grit has a particle size corresponding to 40 mesh openings per inch and finer.

5. A liquid coating material according to claim 3, in which said polyurethane coating material comprises a non-volatile polyurethane resin mixed with an aliphatic hydrocarbon solvent material.

6. A liquid coating material according to claim 3, in which said polyurethane coating material comprises a non-volatile polyurethane resin mixed with an aromatic hydrocarbon solvent material.

7. A liquid coating material according to claim 3, in which said polyurethane coating material comprises a non-volatile polyurethane resin mixed with a ketone hydrocarbon solvent material.

8. A liquid coating material for producing an anti-slip texturized coating, said coating material comprising a paint material including a mixture of a vehicle, a pigment material, and comminuted clear synthetic resin grit having a particle size corresponding to 20 openings per inch and finer.

9. A liquid coating material for producing an anti-slip texturized coating, said coating material comprising a mixture of a polyurethane coating material and comminuted clear synthetic resin grit having a particle size corresponding to 20 mesh openings per inch and finer.

10. A liquid coating material according to claim 8, in which said comminuted clear synthetic resin grit has a particle size corresponding to 40 mesh openings per inch and finer.

11. A liquid coating material according to claim 9, in which said comminuted clear synthetic resin grit has a particle size corresponding to 40 mesh openings per inch and finer.

* * * * *